(12) United States Patent
Seager

(10) Patent No.: US 7,503,546 B1
(45) Date of Patent: Mar. 17, 2009

(54) LIGHT WEIGHT STRAP WINDER

(75) Inventor: Richard Seager, 5 Thomas St., Mystic, CT (US) 06355

(73) Assignee: Richard Seager, Mystic, CT (US)

(*) Notice: Subject to any disclaimer, the term of this patent is extended or adjusted under 35 U.S.C. 154(b) by 0 days.

(21) Appl. No.: 11/680,859

(22) Filed: Mar. 1, 2007

Related U.S. Application Data

(60) Provisional application No. 60/778,498, filed on Mar. 1, 2006.

(51) Int. Cl.
*B21F 9/00* (2006.01)

(52) U.S. Cl. .................. 254/218; 254/223; 74/577 S

(58) Field of Classification Search ............... 254/213, 254/217, 218, 222, 223, 262, 263; 242/389, 242/394; 24/68 CD, 909; 74/575, 577 R, 74/577 S, 520
See application file for complete search history.

(56) References Cited

U.S. PATENT DOCUMENTS

| | | | | |
|---|---|---|---|---|
| 1,754,691 A | * | 4/1930 | Oskar | 254/369 |
| 2,969,221 A | * | 1/1961 | Harmes | 254/218 |
| 4,155,537 A | * | 5/1979 | Bronson et al. | 242/388.3 |
| 4,584,742 A | * | 4/1986 | Speich | 24/68 CD |
| 4,912,813 A | * | 4/1990 | Muller et al. | 24/68 CD |
| 5,282,296 A | | 2/1994 | Huang | |
| 5,426,826 A | | 6/1995 | Takimoto | |
| 6,102,371 A | * | 8/2000 | Wyers | 254/218 |
| 6,158,092 A | | 12/2000 | Huang | |
| 6,654,987 B1 | * | 12/2003 | Wu | 24/68 CD |
| 2003/0093884 A1 | * | 5/2003 | Doty | 24/302 |
| 2003/0146424 A1 | | 8/2003 | Lee | |
| 2006/0197071 A1 | * | 9/2006 | Huang | 254/217 |

OTHER PUBLICATIONS

Tangent. (2008). In Merriam-Webster Online Dictionary. Retrieved May 15, 2008, from http://www.merriam-webster.com/dictionary/tangent.*

* cited by examiner

*Primary Examiner*—Emmanuel M Marcelo
(74) *Attorney, Agent, or Firm*—Bachman & LaPointe, P.C.

(57) ABSTRACT

A strap winder includes a base having a first strap end connecting structure; a ratchet wheel rotatably mounted in the base and having a second strap end connecting structure; and a handle pivotably mounted to the base and preferably engaging the ratchet member so that pivot of the handle in an opening movement, wherein the handle is moved away from the base, does not rotate the ratchet wheel, and wherein pivot of the handle in a closing movement, wherein the handle is moved toward the base, rotates the ratchet wheel. The strap winder is preferably made at least partially from plastic, and has characteristics which facilitate injection molding.

13 Claims, 4 Drawing Sheets

LIGHT WEIGHT STRAP WINDER

CROSS-REFERENCE TO PROVISIONAL APPLICATION

This application claims the benefit of provisional application Ser. No. 60/778,498 filed Mar. 1, 2006.

BACKGROUND OF THE INVENTION

The invention relates to a ratcheting strap winder and, more particularly, to a light weight, preferably injection-molded, strap winder which is especially useful in portable applications, for example in backpacks and other items intended to be carried.

Conventional strap winders are typically made of metallic materials and are heavy and somewhat expense to manufacture. These assemblies work very well for their intended purpose, but can be significantly over-designed for some uses. For example, some uses do not involve stresses to the extent which require metal components, and further are in an environment where the assembly is part of a structure which is to be carried, for example by a person. Under such circumstances, the typical metallic strap winder is too expense, too heavy and far "over-designed" for the task at hand.

It is clear that the need exists for a light-duty strap winder structure.

It is therefore the primary object of the present invention to provide such a device.

It is a further object of the present invention to provide a strap winder which is simple and ergonomic in use.

It is a still further object of the present invention to provide a strap winder which is efficient and relatively low cost in manufacture.

Other objects and advantages of the present invention will appear below.

SUMMARY OF THE INVENTION

In accordance with the present invention, the foregoing objects and advantages have been readily obtained.

According the invention, a light weight strap winder assembly is provided which is made of plastic material preferably through injection molding, and which advantageously includes three components. The assembly includes a base member, a handle member and a ratchet wheel which advantageously snaps into place to hold the assembly together. In further accordance with the invention, the ratchet wheel and handle are designed so that the strap pulling motion is performed by pulling the handle back toward the base. This is in contrast to many conventional strap winders wherein the winding motion is performed on the up-stroke while moving the handle away from the base.

Still further according to the invention, the ratchet wheel is advantageously designed having ratchet teeth and other features which are advantageously aligned so as to assist in efficient injection molding.

BRIEF DESCRIPTION OF THE DRAWINGS

A detailed description of preferred embodiments of the present invention follows, with reference to the attached drawings, wherein.

DETAILED DESCRIPTION

The invention relates to a strap winder assembly and, more particularly, to a light weight strap winder assembly preferably made from plastic, further preferably made through injection molding, which is suitable for light-duty applications, and which has reduced weight and cost as compared to metallic conventional strap winders.

Figure 1:
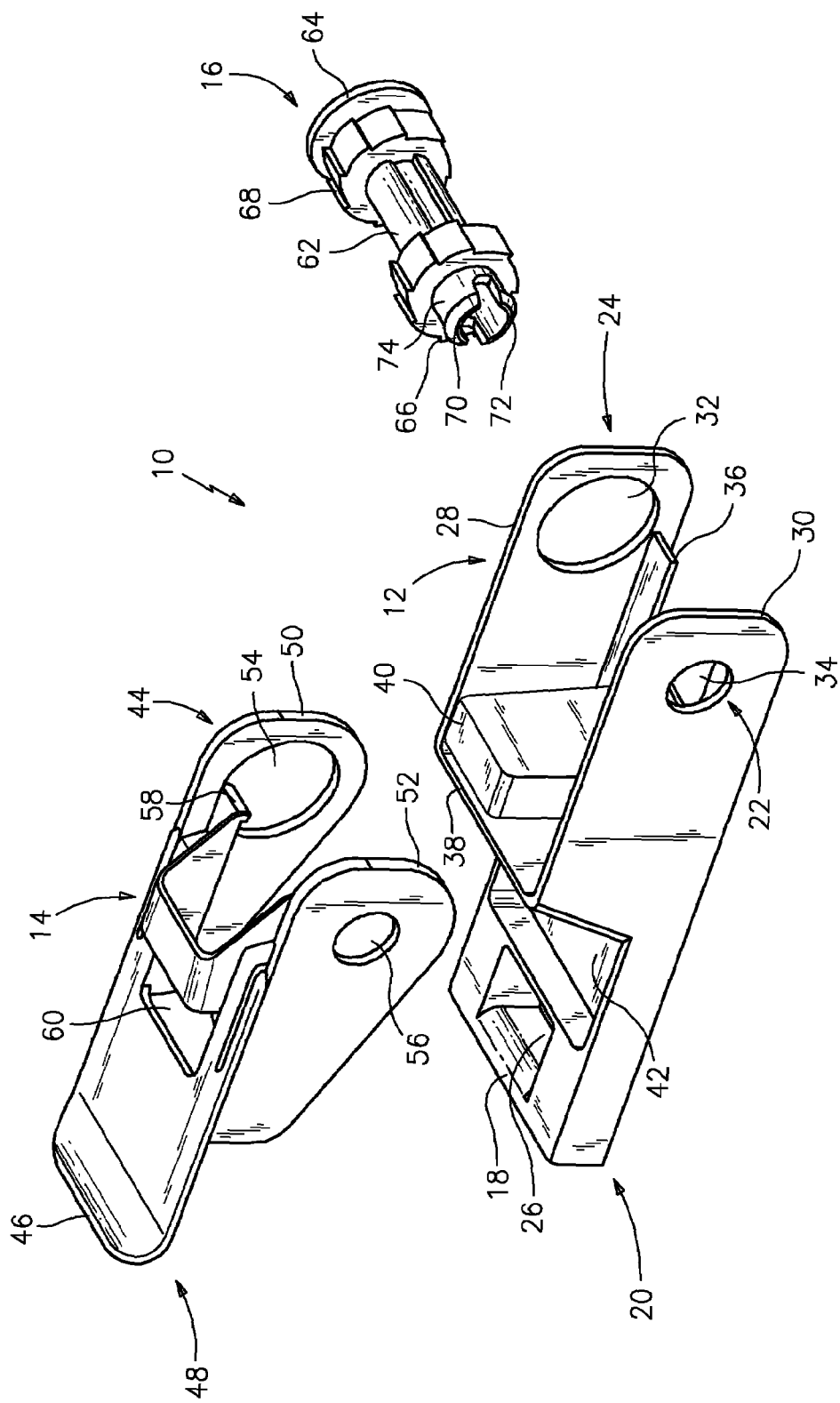
FIG. 1 is an exploded view of a strap winder according to the invention.

FIG. 1 shows a strap winder assembly 10 in accordance with the present invention which comprises a base 12, a handle 14 and a ratchet wheel 16. FIG. 1 shows these components in an exploded state to better illustrate their details, while FIG. 2 shows the assembled device.

Figure 2:
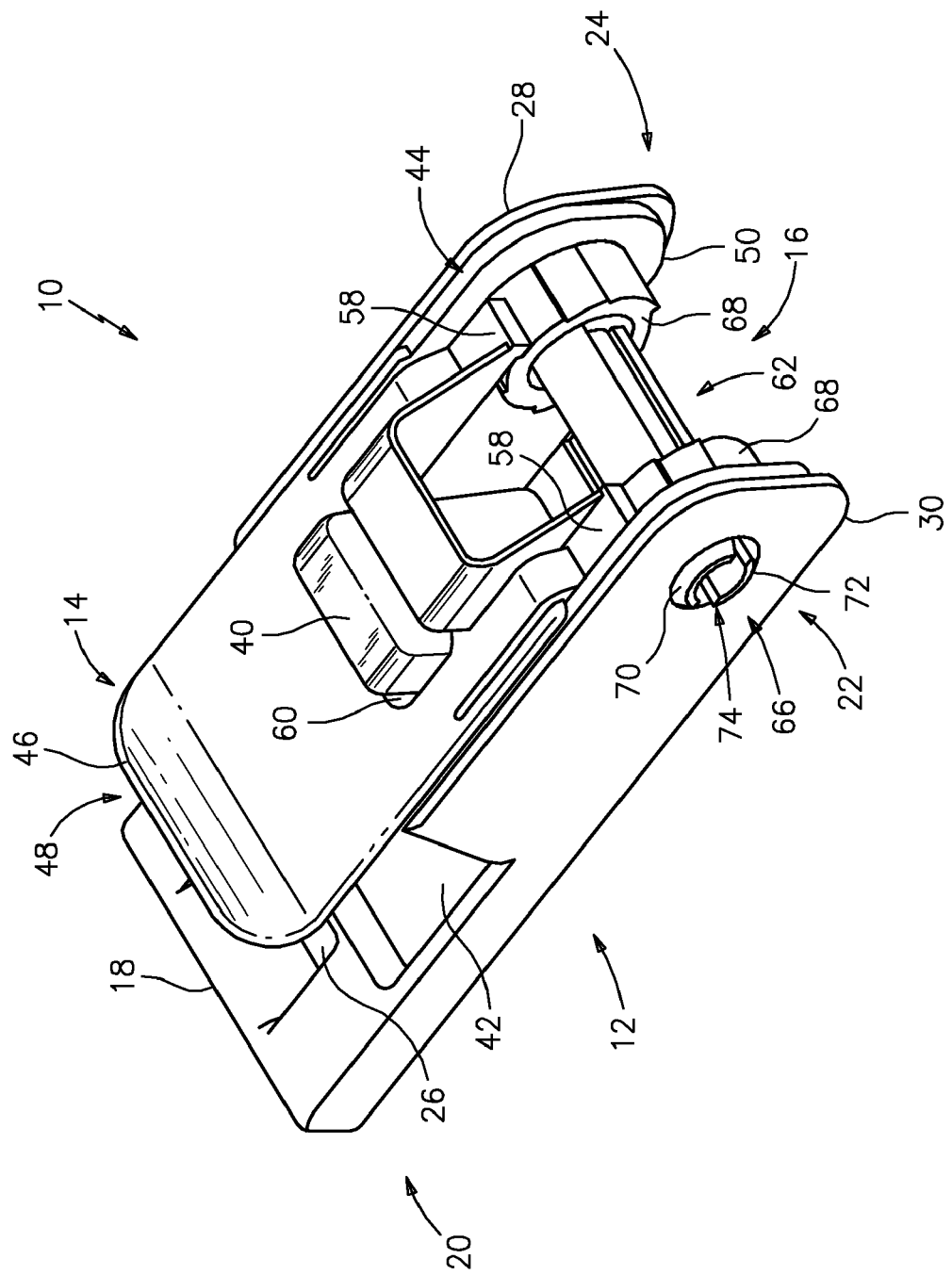
FIG. 2 illustrates the strap winder of FIG. 1 in a closed position.

With continuing reference to both FIGS. 1 and 2, each of the above-described components will be further discussed.

Base 12, as shown in the drawings is preferably provided in the form of a relatively flat rectangular structure having a strap end connecting structure 18 at one end 20, and having mounting structure 22 for receiving handle 14 and ratchet wheel 16 at the other end 24.

Strap end connecting structure 18 can suitably be a transverse beam or shaft of material with an opening 26 position behind same to allow connection of a strap as desired and in well known fashion.

The structure for accepting handle 14 and ratchet wheel 16 can suitably be two spaced walls 28, 30, each of which has a hole 32, 34 defined therein. Holes 32, 34 define ratchet wheel mounting openings, and serve to rotatably receive ratchet wheel 16 in a manner which will be further discussed below.

Base 12 also preferably includes a ratchet stop 36, which can advantageously be a substantially elongate member which extends into contact with at least one tooth of ratchet wheel 16 in order to prevent reverse-rotation of ratchet wheel 16 as will be further discussed below.

Figure 4:
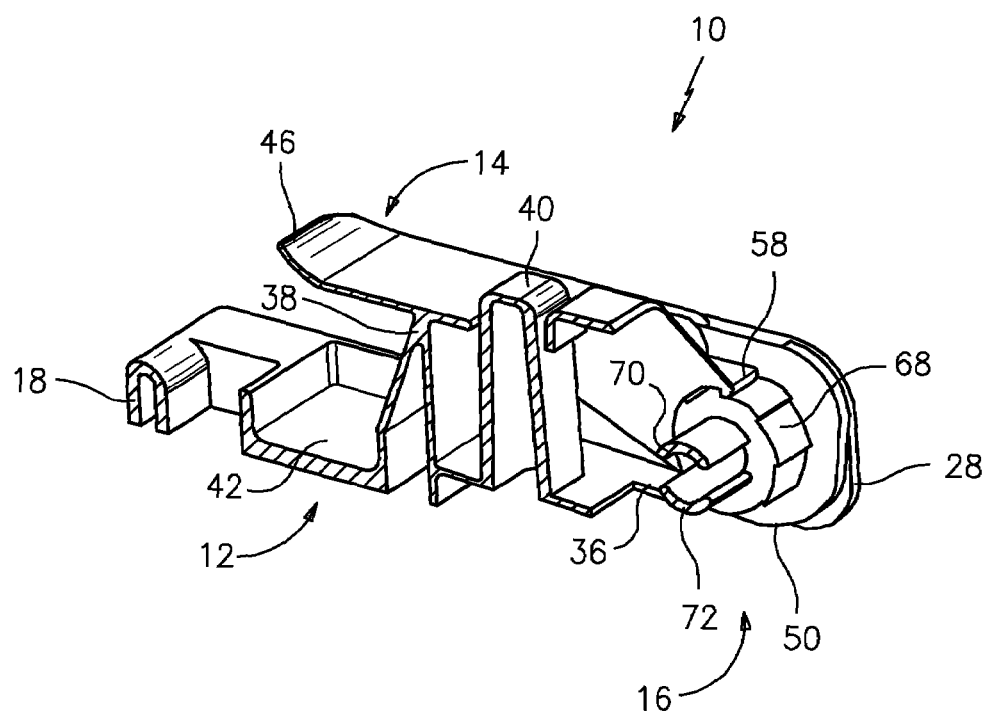
FIG. 4 is a sectional view taken through a strap winder according to the invention.

Base 12 still further preferably has a centrally defined rib 38 which serves as a stop for handle 14, as is best illustrated in FIG. 4 to be discussed below. Still further, base 12 preferably includes an upstanding stabilizing member 40, which is positioned to engage with handle 14 when handle 14 is in the closed position of FIG. 2, and thereby stabilize ratchet assembly 10 as desired.

Base 12, further preferably includes a substantially flat portion 42 which can advantageously be positioned rearwardly of central rib 38 and which provides an area for gripping with one hand while operating the ratchet assembly 10 according to the invention.

The structure of base 12 as illustrated in FIG. 1 is readily manufacturable through conventional injection molding techniques and such preparation is preferred so as to provide a plastic and therefore light-weight assembly for use in accordance with the present invention.

Still referring to FIGS. 1 and 2, handle 14 advantageously has structure at one end 44 for rotatably engaging with ratchet wheel 16 and a substantially flat and preferably ergonomically designed handle 46 at the other end 48. Handle 46 is preferably a flat member which is positioned and oriented such that when ratchet assembly 10 is assembled, handle 46 in a closed position such as is shown in FIG. 2 is substantially parallel to the flat plane of base 12.

Structure 44 for rotably connecting ratchet wheel 16 is advantageously provided in the form of two walls 50, 52 which depend downwardly from handle 46 and have holes 54, 56 formed therein. Holes 54, 56 advantageously define ratchet wheel passing openings, and align with holes 32, 34 of base 12, such that ratchet wheel 16 can advantageously be snapped through both pairs of holes to lock assembly 10 in an operative condition. This will be further discussed below.

Figure 3:
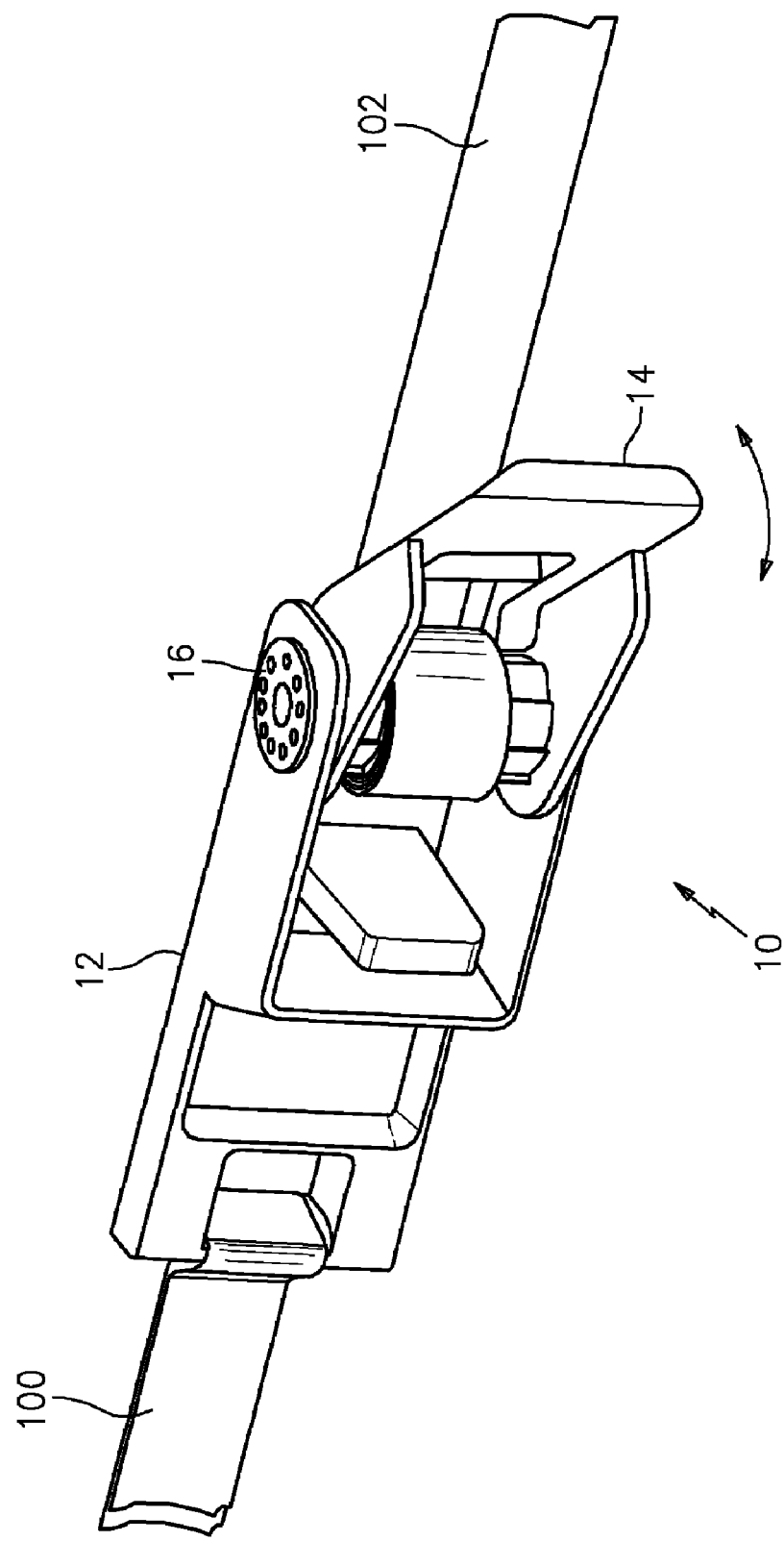
FIG. 3 further illustrates the strap winder of FIG. 1 in an environment of use with the handle pivoted away from the base.
Figure 5:
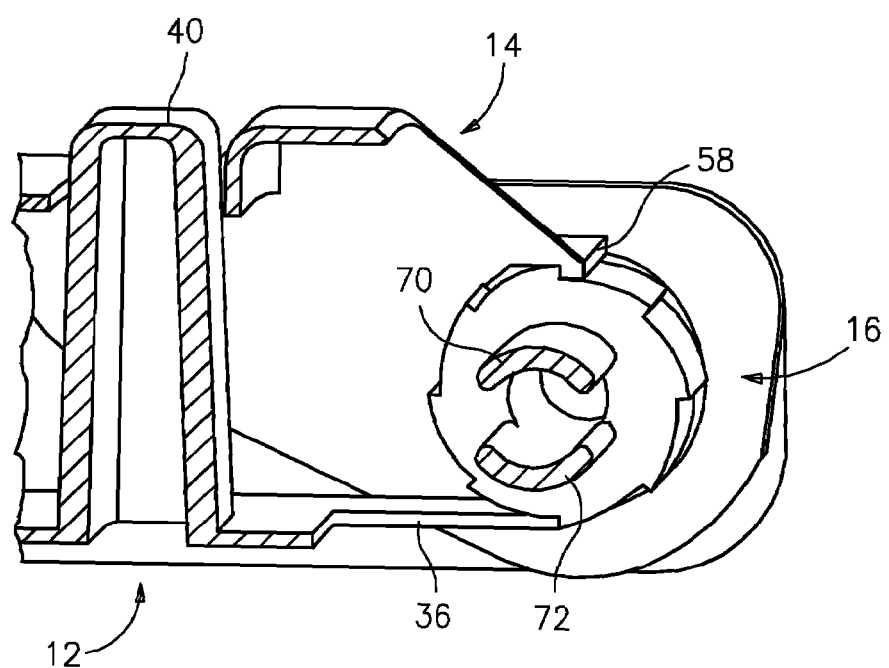
FIG. 5 is an enlarged sectional view of the front portion of the apparatus shown in FIG. 4.

Handle member 14 further preferably includes at least one advancing ratchet 58 which is positioned to engage with ratchet wheel 16 when assembly 10 is assembled in an operative condition, and to advance ratchet wheel 16 when handle member 14 is rotated or pivoted relative to base 12. As illustrated in FIGS. 4 and 5 to be discussed below, advancing ratchet 58 is preferably structured and positioned to advance ratchet wheel 16 along with a strap held thereby during a downward or closing stroke of handle 14 relative to base 12. A downward stroke as used herein is defined as movement of handle 14 from an open position as illustrated in FIG. 3 toward the closed position as illustrated in FIG. 2.

Advancing ratchet 58 is preferably provided in the form of a downwardly-depending tooth or hook which can slide over teeth of ratchet wheel 16 during an opening-stroke of handle 14 relative to base 12, and which engages with a tooth of ratchet wheel 16 during the closing stroke.

Handle 14 further preferably includes an opening 60 which is aligned to receive stabilizing member 40 when handle 14 is in the closed position with respect to base 12 as illustrated in FIG. 2. This serves to further stabilize assembly 10 in a rest condition.

Ratchet wheel 16 is advantageously a substantially elongated shaft 62 having a collar 64 arranged at one end and a locking structure 66 positioned at the other end. Along shaft 62 and between collar 64 and locking structure 66, ratchet wheel 16 further preferably includes at least one ratchet gear 68 position to engage with advancing ratchet 58 during a downward stroke of handle 14 as discussed above.

Shaft 62 of ratchet wheel 16 is advantageously a split shaft having two halves as better illustrated in FIGS. 4 and 5. This helps to maintain the light-weight nature of assembly 10 according to the present invention, to conserve material, and to nevertheless provide a device which has sufficient structural rigidity. Further, the gap or central opening between halves defines a second strap end connecting structure and can be used to secure a strap to be tensioned as is well known in the art.

Locking structure 66 is advantageously provided as two cylinder halves 70, 72, each of which has an outwardly extending collar 74 which is beveled or sloped at the distal end of the device. This structure is sized to snapingly engage through hole 34 of base 12 during assembly.

Thus, during assembly of the apparatus 10 according to the invention, handle 14 is positioned relative to base 12 with holes 54, 56 aligned with holes 32, 34. In this position, ratchet wheel 16 is inserted with locking structure 66 first through larger holes 32, 54 and then through hole 56 of handle 14 and into snapped engagement with hole 34 of base 12. In this position, ratchet assembly 10 is ready for use as desired.

The teeth of ratchet wheel 16 are preferably designed such that surfaces are either parallel to or perpendicular to the other surfaces of this structure, specifically the split-half portions of shaft 62. This assists in the plastic injection molding of ratchet wheel 16 by allowing for a part which can be manufactured with two mold halves in a simple and efficient manner. In order to accomplish this, several approaches can be taken. One approach would be to utilize wheels having only four teeth and utilizing a handle member 14 designed to pivot sufficiently to advance one tooth per stroke. Alternately, a wheel 16 can be used have more than four teeth while the mold part line and angles of wheel 16 are nevertheless selected to simplify molding. Of course, while these are two specific examples of preferred embodiments of the invention, other embodiments and variations can be used well within the broad scope of invention.

FIG. 4 shows a sectional view of ratchet assembly 10 in accordance with the present invention in an assembled and closed position. As shown, in this position, handle 14 rests against up-standing central rib 38 with stabilizing member 40 engaged into opening 60. This is a rest position and is the proper position in which ratchet assembly 10 should be left when not in use for winding a strap.

FIG. 5 shows an enlarged cutaway portion of FIG. 4, and further illustrates the interaction between advancing ratchet 58, ratchet teeth on ratchet wheel 16, and holding ratchet 36 according to the invention. As made clear from this illustration, ratchet wheel 16 is locked against rotation in clockwise manner when handle 14 is pivoted up and away from base 12. This prevention of rotation is due to the engagement of holding ratchet 36 with teeth on ratchet wheel 16 during such motion.

When handle 14 is then brought back through a downward stroke, advancing ratchet 58 engages with teeth of ratchet wheel 16 and rotates ratchet wheel 15 in a counter-clockwise manner while holding ratchet 36 rides along the sloped back-facing surfaces of the teeth of ratchet wheel 16. It should be readily apparent that this structure advantageously allows for a strap winding device wherein the closing or force-requiring motion is the downward stroke, which is more ergonomically appropriate for use of the device.

Referring back to FIG. 3, ratchet assembly 10 is illustrated in a position of use, connected between two ends 100, 102 of a strap. One end 100, as discussed above, is connected at structure 18 of base 12, while the other end 102 is connected to ratchet wheel 16, preferably by being threaded through the gap between the halves of shaft 62. In this configuration, during winding, end 102 of the strap is incrementally wound upon ratchet wheel 16 as desired in accordance with the present invention.

It should be readily appreciated that ratchet assembly 10 in accordance with the present invention is advantageously a light-weight and economically manufactured assembly which is perfectly well suited to light-duty use environments, for example in backpacks and other types of gear. Assembly 10 is advantageously manufactured of plastic materials, and is most preferably manufactured through injection molding to allow for efficient and reliable manufacture of the three components of the assembly.

It should be appreciated that while the assembly as illustrated in FIGS. 1-5 results in strap tightening during a downward stroke, it is within the broad scope of the present invention to reverse the orientation of teeth and wind the strap during an up-stroke.

It should also be appreciated that although the broad invention certainly includes use of a single advancing ratchet and a single ratchet wheel on ratchet structure 16, a more stable and thereby preferred structure has two spaced ratchet wheels on ratchet wheel structure 16, and two advancing ratchets 58 adapted to engage therewith. This serves to spread the stress of tightening of the strap across the entire ratchet wheel 16, rather than concentrating this stress in one point.

It should be appreciated that the present invention is particularly well suited to light-duty environments of use, and thereby presents a desirable alternative to conventional metallic strap winding devices when light-duty uses are called for.

It should finally also be appreciated that the present disclosure is made in terms of a preferred embodiment, and that the details provided herein are not to be considered limiting on the broad scope of the present invention, but rather are intended as illustration of examples of one embodiment of the invention.

What is claimed is:

1. A strap winder, comprising:
   a base having a first strap end connecting structure;
   a ratchet wheel rotatably mounted in the base and having a second strap end connecting structure, wherein the ratchet wheel has a locking structure at one end and a flange at the other end; and
   a handle pivotably mounted to the base, wherein the base has two ratchet wheel mounting openings and the handle has two ratchet wheel passing openings, wherein the ratchet wheel mounting opening and ratchet wheel passing opening on a flange side of the ratchet wheel are larger than the ratchet wheel mounting opening and ratchet wheel passing opening on the locking structure side of the ratchet wheel, wherein the handle has an advancing ratchet with an arm extending from the handle to the ratchet wheel along a direction which is tangent to the ratchet wheel engaging the ratchet member so that pivot of the handle in an opening movement, wherein the handle is moved away from the base, does not rotate the ratchet wheel, and wherein pivot of the handle in a closing movement, wherein the handle is moved toward the base, rotates the ratchet wheel which extends through the ratchet wheel mounting openings and the ratchet wheel passing openings, wherein the locking structure snaps through one of the ratchet wheel mounting openings to hold the ratchet wheel in place relative to the base and the handle.

2. The strap winder of claim 1, wherein at least one of the base, ratchet wheel and handle is made of plastic.

3. The strap winder of claim 1, wherein each of the base, ratchet wheel and handle is made of plastic.

4. The strap winder of claim 1, wherein the base has an upstanding stabilizing member and the handle has an opening, and wherein the stabilizing member extends through the opening when the handle is in a closed position with respect to the base.

5. The strap winder of claim 1, wherein the ratchet wheel has at least one set of ratchet teeth, and wherein the advancing ratchet engages at least one tooth of the set of ratchet teeth during a closing movement of the handle.

6. The strap winder of claim 5, wherein the base has a ratchet stop which engages at least one tooth of the set of ratchet teeth and holds the ratchet wheel against rotation in one direction relative to the base.

7. The strap winder of claim 5, wherein the ratchet wheel has two sets of ratchet teeth spaced along an axial length of the ratchet wheel, and wherein the handle has two advancing ratchets for engaging the two sets of ratchet teeth.

8. The strap winder of claim 1, wherein the ratchet wheel has a central shaft defining a central opening as the second strap end receiving structure.

9. The strap winder of claim 8, wherein the locking structure comprises an axial extension of the central shaft, and at least two radially extending members which extend outwardly beyond edges of the ratchet wheel mounting opening on the locking structure side of the ratchet wheel.

10. The strap winder of claim 9, wherein edges of the central opening and inner edges of the radially extending members are aligned to facilitate injection molding of the ratchet wheel.

11. The strap winder of claim 10, wherein the ratchet teeth of the ratchet wheel have flat surfaces which are either substantially parallel or substantially perpendicular to the edges of the central opening and the inner edges of the radially extending members, whereby injection molding of the ratchet wheel is further facilitated.

12. A method for assembling a strap winder, comprising the steps of:
   positioning a handle having first and second ratchet wheel passing openings relative to a base having first and second ratchet wheel mounting openings wherein either of the first or second ratchet wheel mounting opening and either of the first or second ratchet wheel passing opening on one side of the ratchet wheel are larger than the other of the first or second ratchet wheel mounting opening and the first or second ratchet wheel passing opening on the other side of the ratchet wheel, such that the ratchet wheel passing openings and the ratchet wheel mounting openings align with each other;
   inserting a ratchet wheel having a first end having a locking structure and a second end having a flange through the ratchet wheel passing openings and the ratchet wheel mounting openings, with the locking structure first, such that the locking structure passes through the first ratchet wheel mounting opening, then the first ratchet wheel passing opening, and then the second ratchet wheel passing opening, and then engages with the second ratchet wheel mounting opening.

13. The method of claim 12, further comprising the steps of connecting a first strap to the base and a connecting a second strap to the ratchet wheel.

* * * * *